(No Model.) 2 Sheets—Sheet 2.
W. SMITH.
MACHINE TABLE.
No. 319,757. Patented June 9, 1885.
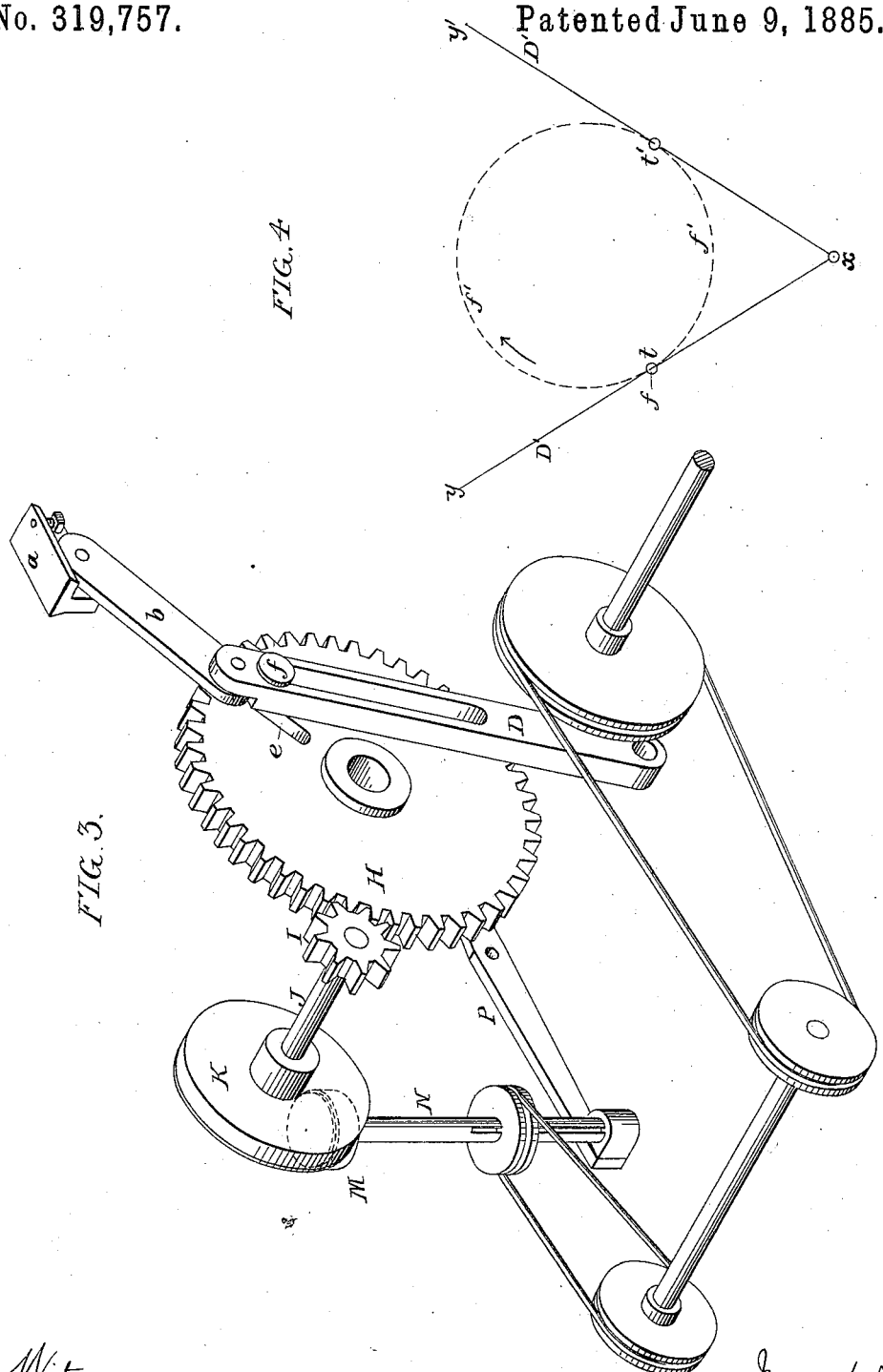

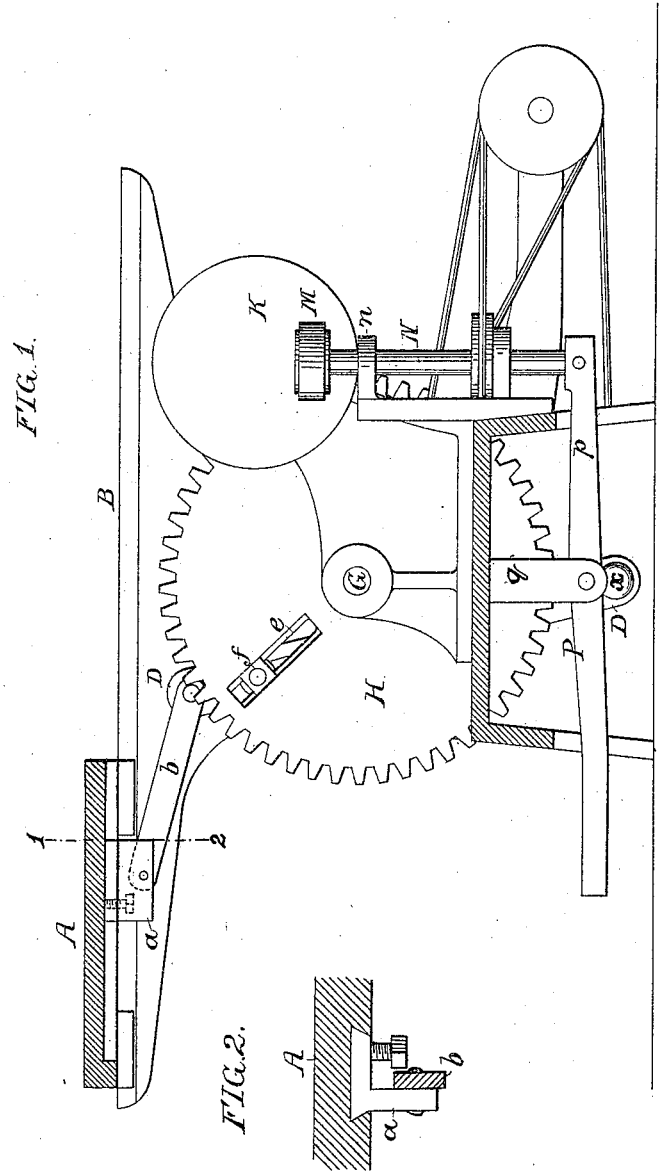

UNITED STATES PATENT OFFICE.

WALTER SMITH, OF SHARON HILL, PENNSYLVANIA.

MACHINE-TABLE.

SPECIFICATION forming part of Letters Patent No. 319,757, dated June 9, 1885.

Application filed April 6, 1885. (No model.)

*To all whom it may concern:*

Be it known that I, WALTER SMITH, a citizen of the United States, and a resident of Sharon Hill, Delaware county, Pennsylvania, have invented certain Improvements in Tenoning-Machines, of which the following is a specification.

My invention consists of the devices described and claimed hereinafter, whereby a differential reciprocating motion may be imparted to the bed or work-plate of the machine.

In the accompanying drawings, Figure 1, Sheet 1, is a side view, partly in section, of sufficient of a tenoning-machine to illustrate my invention; Fig. 2, a section of part of Fig. 1 on the line 1 2; Fig. 3, Sheet 2, a perspective view of the devices forming the subject of my invention, and Fig. 4 a diagram illustrating the invention.

A is the bed or work-plate of a tenoning-machine, which has to be reciprocated on guides on the frame-work B.

To the bed A is adjustably secured a block, $a$, which is connected by a link, $b$, to the upper end of an arm, D, pivoted at $x$.

A shaft, G, having its bearings in the frame-work of the machine, carries a cog-wheel, H, in which is a radial slot, $e$, and in the latter is secured a pin, $f$, which projects into or through an elongated slot in the said arm D.

Into the wheel H gears a pinion, I, Fig. 3, on a shaft, J, which has its bearings in the frame-work of the machine, and which is furnished with a friction-disk, K, and against the face of the latter bears the periphery of a smaller friction-disk, M, on a shaft, N, which has one bearing, $n$, in the frame-work of the machine, and its other bearing in the arm $p$ of a lever, P, which is pivoted to a hanger, $q$, on the frame-work.

Sundry shafts, pulleys, and bands are shown in the drawings, and these I propose to use in some instances; but it is immaterial how or through what system of belts and gearing the shaft N may be driven, nor is it material what mechanism is used for raising and lowering this shaft N, as many different appliances for this purpose will readily suggest themselves to expert mechanics.

Supposing that the wheel H is revolving at a uniform speed in the direction of the arrow, Fig. 4, the dotted circle $f'$ in the diagram indicates the circular path in which the center of the pin $f$ traverses, the inclined lines D' D' indicating the two extreme positions which the lever D must assume during each revolution of the wheel H, and the two points $y\ y'$ showing the distance traversed to and fro by the bed A during each revolution of the wheel H.

The pin $f$ must traverse from $t$ to $t'$, or about two-thirds of the circumference of the circle $f'$, in order to effect a complete movement of the arm D from $y$ to $y'$, while precisely the same extent of movement of the arm back from $y'$ to $y$ is effected while the pin $f$ is traversing from $t'$ to $t$—a distance equal to about one-third of the circumference of the dotted circle $f'$ in the diagram, Fig. 4; hence while the wheel H rotates at a uniform speed the bed A will be moved in one direction faster than in the other.

There is a further control of the movement of the bed due to the differential rotation of the wheel K, and this is governed by the attendant, who, by operating the lever P, can raise or lower the shaft N and bring the friction-disk M nearer to or farther from the center of the friction-disk K, thus increasing or diminishing the speed of the bed, without, however, altering the differential character of said movement.

The changing of the speed of the wheel H may be effected by devices other than friction-wheels. Ordinary conical pulleys with a belt under the control of the attendant may, for instance, be used.

The block $a$ can be adjusted in a dovetailed groove in the bed A, as shown in Fig. 2, suitable means being provided for securing it after adjustment. While an adjustment of the block will not alter the extent of movement of the bed, it will alter the limit of its movement, the extent of movement being alterable by adjustment of the pin $f$ in the slot of the wheel H.

I am aware that in various kinds of machinery operating wheels or cranks have been provided with crank-pins and means for adjusting the same from and toward the center, so as to vary the throw of the wheel or crank while the latter is rotating; and, also, that a pivoted and slotted arm has been combined with an operating-crank for the purpose of giving differential movement to the device connected to said arm; hence I claim neither of these things; but

I claim as my invention—

1. The combination of the frame, the bed or carrier A, the slotted arm D, pivoted to the frame and connected to the bed, the wheel H, carrying a pin projecting into the slot of the arm, a driving-shaft rotating at a uniform speed, and transmitting-gearing, part of which is adjustable, as described, whereby the speed of the said wheel H is changed without change in the speed of the driving-shaft, as set forth.

2. The combination of the arm D and means for vibrating the same with the bed or carrier A and the block $a$, adjustably secured to the bed and connected to the arm, substantially as set forth.

3. The combination of the bed or carrier A, the pivoted arm D, connected thereto and having a slot, the wheel H, also having a slot, a pin, $f$, adjustable in the slot of the wheel and adapted to the slot of the arm, and means for rotating the wheel, as set forth.

In testimony whereof I have signed my name to this specification in the presence of two subscribing witnesses.

WALTER SMITH.

Witnesses:
HENRY BOSSERT,
HARRY SMITH.